United States Patent
Hall et al.

[11] Patent Number: 5,961,067
[45] Date of Patent: Oct. 5, 1999

[54] METHOD FOR REDUCING TURBOPROP NOISE

[75] Inventors: Edward J. Hall; Joseph P. Meade, both of Indianapolis, Ind.

[73] Assignee: Allison Engine Company, indianapolis, Ind.

[21] Appl. No.: 08/920,618

[22] Filed: Aug. 27, 1997

Related U.S. Application Data

[60] Provisional application No. 60/025,646, Sep. 10, 1996.

[51] Int. Cl.⁶ ................................................. B64D 33/02
[52] U.S. Cl. .......................... 244/1 N; 244/53 B; 244/65; 415/119
[58] Field of Search ................................. 244/1 N, 53 R, 244/53 B, 65; 60/39.02; 415/119

[56] References Cited

U.S. PATENT DOCUMENTS

| | | | |
|---|---|---|---|
| 2,738,148 | 3/1956 | Stulen | 244/65 |
| 4,240,250 | 12/1980 | Harris | 60/39.09 |
| 4,250,703 | 2/1981 | Norris et al. | 60/39.09 P |
| 4,397,431 | 8/1983 | Ben-Porat | 244/53 B |
| 4,456,458 | 6/1984 | Gilbertson | 55/306 |
| 4,534,526 | 8/1985 | Metzger et al. | 244/38 |
| 4,715,559 | 12/1987 | Fuller | 244/1 N |
| 4,881,367 | 11/1989 | Flatman | 60/39.07 |
| 4,972,672 | 11/1990 | Sanderson et al. | 60/39.092 |
| 5,014,933 | 5/1991 | Harm et al. | 244/53 |
| 5,058,617 | 10/1991 | Stockman et al. | 137/15.1 |
| 5,415,522 | 5/1995 | Pla et al. | 244/1 N |
| 5,478,199 | 12/1995 | Gliebe | 415/119 |
| 5,551,649 | 9/1996 | Kaptein | 244/1 N |
| 5,588,619 | 12/1996 | LoPresti et al. | 244/53 R |

OTHER PUBLICATIONS

An Assessment of Propeller Aircraft Noise Reduction Technology, NASA Contractor Report 198237, F. Bruce Metzger, Aug. 1995.

*Primary Examiner*—Galen L. Barefoot
*Attorney, Agent, or Firm*—Woodard, Emhardt, Naughton Moriarty & McNett; Patent and Trademark Attorneys

[57] ABSTRACT

An apparatus and method for reducing noise within the fuselage of a propeller driven aircraft. In one embodiment the propeller blades are spaced apart and in front of an offset inlet. The inlet provides air to a gas turbine engine powering the propeller, and also to a scavenge duct. The propeller blades and inlet are spaced apart such that during cruise conditions for the aircraft, the trailing edge of the propeller blades are spaced apart from the inlet by more than one-fourth of the chord length of the propeller blades, and less than about the chord length of the propeller blades. This spacing reduces the aerodynamic interaction between the propeller blades and a bubble of partially stagnated air in front of the inlet. In another embodiment, the scavenge duct is constructed such that it flows an increased amount of air, thus allowing the inlet duct to flow an increased amount of air. In this second embodiment, the engine duct flows more than about 40% of the total amount of air entering the inlet duct, and less than about 60% of that total airflow. In this manner the size of the slightly stagnated bubble in front of the inlet duct is reduced.

75 Claims, 7 Drawing Sheets

METHOD FOR REDUCING TURBOPROP NOISE

This is a Provisional application No. 60/025,646, filed Sep. 10, 1996.

FIELD OF THE INVENTION

The present invention relates generally to a method for reducing noise from a propeller driven aircraft. However, certain applications may be outside of this field.

BACKGROUND OF THE INVENTION

Reduction of noise generated by aircraft both around and within the aircraft is of increasing importance. Near field noise outside of the aircraft can create pressure fluctuations that can be fatiguing to the structure of the aircraft. This near field noise can also result in interior noise in the fuselage that makes the aircraft less desireable to passengers.

Propeller driven aircraft have near field and interior noise that include frequency content related to operation of the propeller. Various methods are employed to reduce propeller noise, including the use of swept six bladed propellers, active noise control, and tuned mechanical dampers within or on the fuselage. On multi engine aircraft, angular phasing of the propellers has long been used to alter the noise characteristics within the fuselage from the propellers. Often, propellers are placed close to the air inlet for the engine so as to provide boosted inlet pressure and a "supercharging" effect on the engine.

In spite of the various methods used to reduce noise from propeller driven aircraft, there remains a need for further improvement. The present invention does that in a novel and unobvious way.

SUMMARY OF THE INVENTION

One aspect of the present invention provides an apparatus comprising an aircraft with a wing, the aircraft in a cruising condition at an altitude greater than about 20,000 feet above sea level and an airspeed greater than about 250 knots true airspeed. There is also a propeller with a plurality of propeller blades, the propeller being located on the wing and rotatable to provide forward thrust for the aircraft. The propeller blades each have a trailing edge. There is further a gas turbine engine for powering the propeller, there also being an offset inlet duct for providing air to the gas turbine engine. The inlet duct is located such that a portion of each propeller blade passes in front of the inlet duct when the propeller is rotating. The propeller blades are spaced in front of the inlet duct such that the minimum distance from the trailing edge to the inlet duct is greater than about one-fourth of the chord length of the portion of propeller blade, and less than about the chord length of the portion of propeller blade.

It is an object of the present invention to reduce noise from a propeller driven aircraft. These and other objects and advantages of the present invention will be apparent from the figures, description of the preferred embodiment, and the claims.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain conventions will be used in describing the present invention. For example, references to clockwise and counterclockwise rotation, as well as the terms left and right, are for an observer standing at the tail of the aircraft and facing forward toward the cockpit. The terms forward and aftward, or fore and aft, refer to a relative spacing toward the cockpit or tail, respectively. The letter designations a or b refer to similar items or features that are on the left and right side of the aircraft, respectively. Designations of inboard and outboard refer to items or features near or away, respectively, from the fuselage. The term blade passage frequency (BPF) refers to the frequency of the rotating propeller, and is calculated by multiplying the number of propeller blades times the rotational speed of the propeller. The terms 2×BPF and 3×BPF refer to the first and second harmonics, respectively, of BPF. All references to acoustic noise in decibels refer to the A scale. Noise values for the interior of the fuselage are for an average seated level. References to airspeed are in knots true airspeed (KTAS) and to altitude in feet above sea level. This application incorporates by reference provisional application Ser. No. 60/025,646, filed Sep. 10, 1996.

Figure 1:
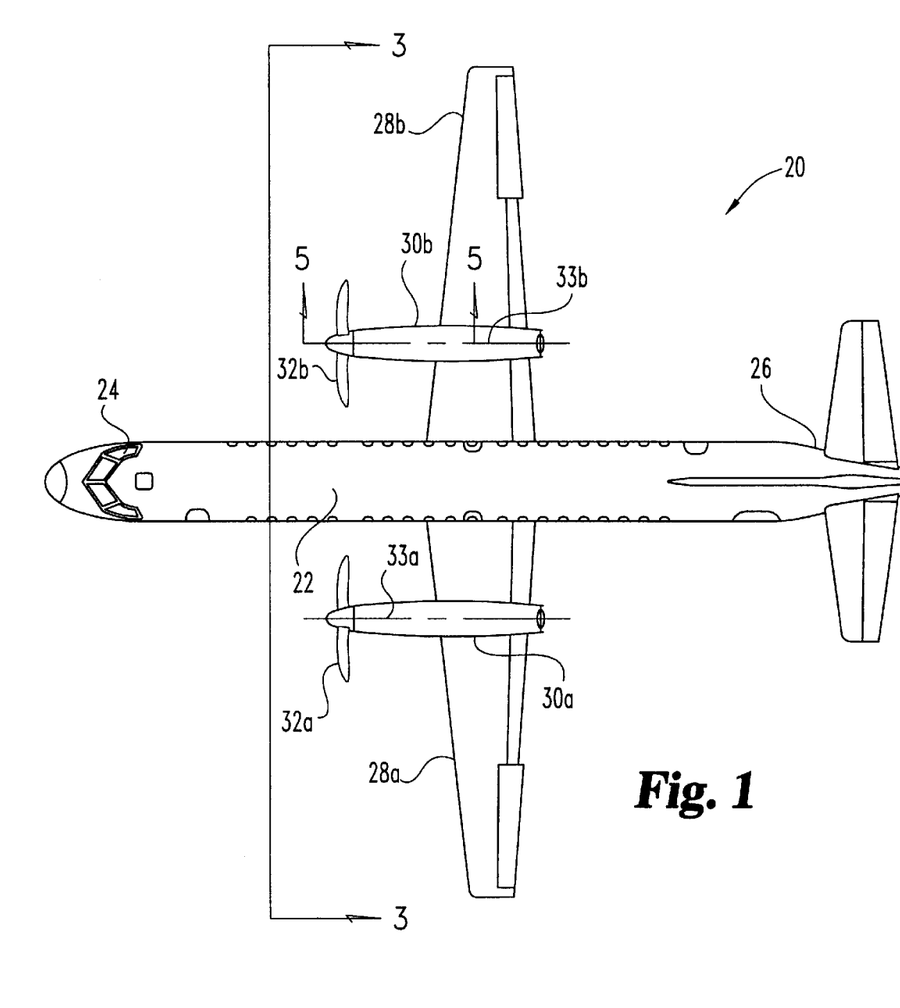
FIG. 1 is a top plan view of an aircraft incorporating first and second embodiments of the present invention.

FIG. 1 is a top plan view of an aircraft incorporating first and second embodiments of the present invention. Aircraft 20 includes a fuselage 22 capable of carrying about fifty passengers, with a cockpit 24 and a tail 26. Attached to fuselage 22 are left and right wings 28a and 28b, respectively. Each wing 28 incorporates a nacelle 30 which includes a propeller 32 powered by a gas turbine engine. Each propeller rotates about a rotational axis 33. Although a fifty passenger aircraft is shown, the present invention is useful with both smaller and larger propeller driven aircraft.

Figure 2:
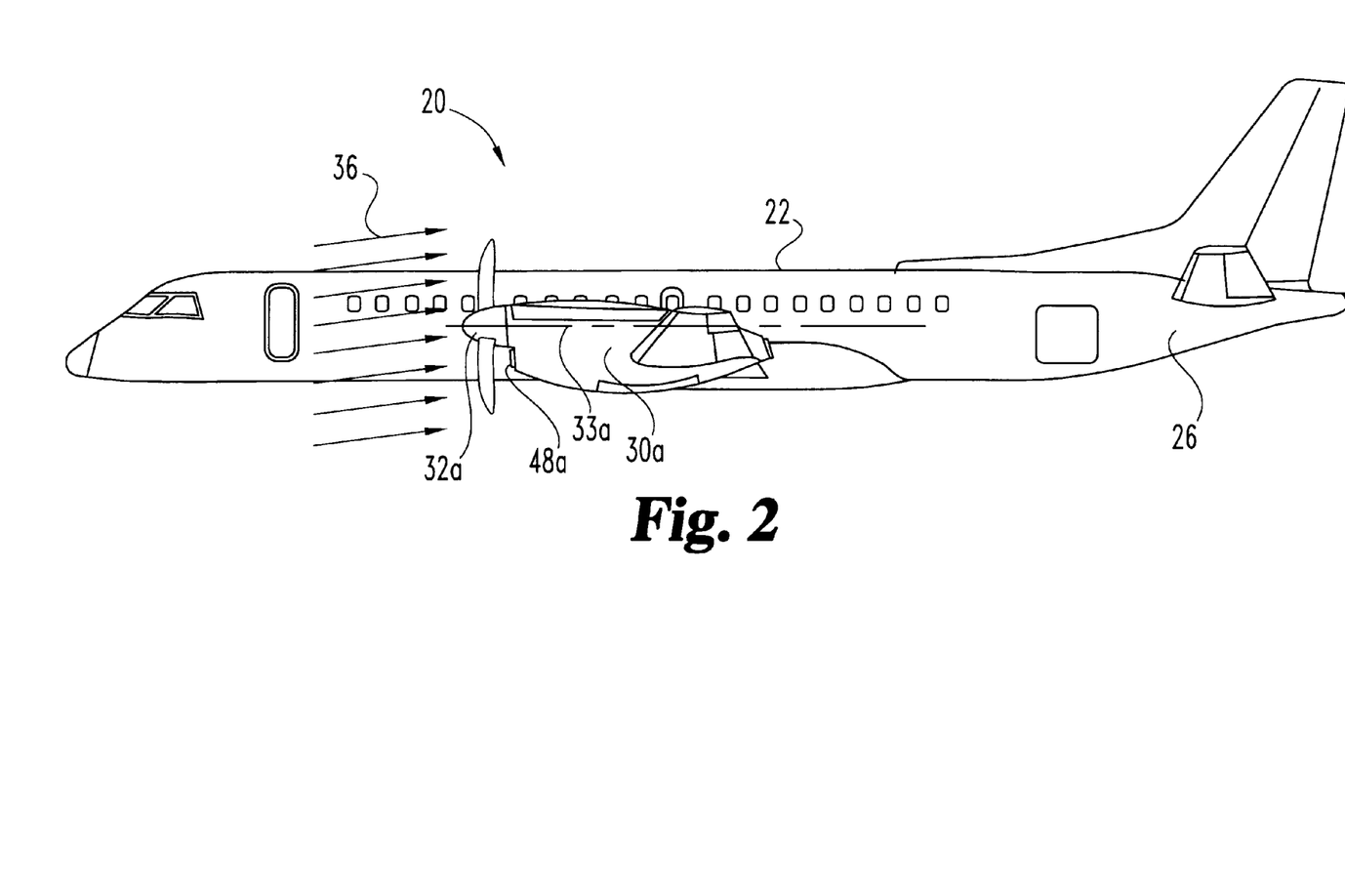
FIG. 2 is a left side elevational view of the aircraft of FIG. 1.

FIG. 2 is a left side elevational view of the aircraft of FIG. 1. Left nacelle 30a is shown incorporating a left inlet duct 48a behind left propeller 32a and below rotational axis 33a. Freestream air velocity streamlines 36 represent the airspeed and angle of attack of aircraft 20. Streamlines 36 indicate a manner of operating aircraft 20 in a typical cruise condition, in which there can be a positive angle of attack of aircraft 20 and propellers 32 relative to streamlines 36. For example, in one application at a cruise speed of about 340 KTAS and an altitude of about 30,000 feet there is about a 0 to 2 degree angle of attack from the fuselage to freestream 36 and about a 2 degree angle of attack from the rotational axis of the propeller to freestream 36.

Figure 3:
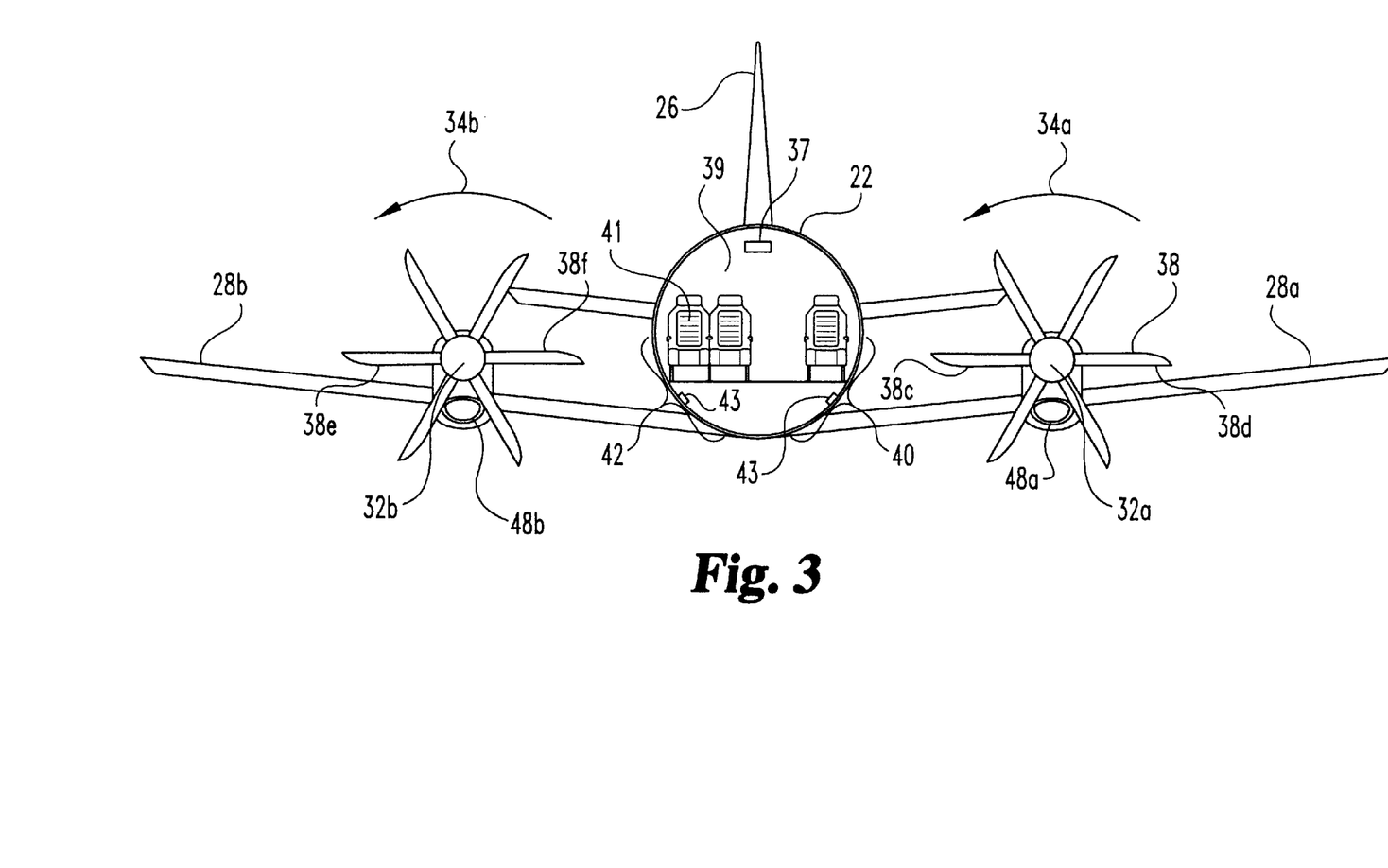
FIG. 3 is a diagramatic representation of the aircraft of FIG. 1 taken along line 3—3.

FIG. 3 is a diagramatic representation of the aircraft of FIG. 1 taken along line 3—3. Each propeller 32 is shown to include six propeller blades 38, although the present invention is useful with propellers including a fewer number or a greater number of blades. Between propellers 32 is fuselage 22, which has a fuselage interior 39. Seats 41 are shown within fuselage interior 39, although the present invention is also useful for a fuselage interior 39 containing cargo or equipment.

Area 40 of fuselage 22 shows a general area of the fuselage 22 adjacent left propeller 32a and left wing 28a where noise is transmitted into fuselage interior 39. As propeller 32a rotates in a clockwise direction as depicted by arrow 34a, the angle of attack of aircraft 20 typical of a cruise condition causes the propeller blade at position 38c to have an increased local airspeed as it passes near area 40. Air passing over propeller blade 38c has a generally higher velocity than air passing over propeller blade 38d. As propeller blade 38c rotates from top to bottom, blade 38c has a forward airspeed component that is additive to the velocity of streamlines 36 because of the angle of attack of propeller 32a. Likewise, propeller blade 38d has a rearward velocity component that is subtracted from the velocity of streamlines 36 as it rotates from bottom to top which results in a lower airspeed over blade 38d. Blade 38c is sometimes referred to as an advancing blade, and blade 38d is sometimes referred to as a retreating blade.

Similar reasoning applies to propeller blade 38e of propeller 32b, which has a higher airspeed similar to that of blade 38c. Similarly blade 38f has a lower airspeed similar to that of blade 38d. Because of this effect of propeller angle of attack on blade airspeed, propeller blade 38c can generate higher near field acoustic noise than propeller blade 38f. It has been recognized that area 40 of fuselage 22 may have impinging on it higher fluctuating air pressure than area 42. In some applications, this results in area 40 generating more acoustic noise within interior 39 than area 42.

Although the foregoing explanation referred to propellers with clockwise rotation, one of ordinary skill in the art will recognize the applicability of the present invention to propellers with counterclockwise rotation and to counter rotating propellers. Those of ordinary skill in the art will also recognize that the present invention is also applicable but less preferred, with inlet ducts located above or beside the axis of rotation of the propeller.

For the description of the first embodiment of the present invention to follow, reference will be made to an aircraft 20 in which both propellers rotate in clockwise fashion. However, one of ordinary skill in the art will recognize the applicability of the present invention to propellers rotating in the counterclockwise direction, or to counter rotating propellers rotating in either direction.

Figure 4:
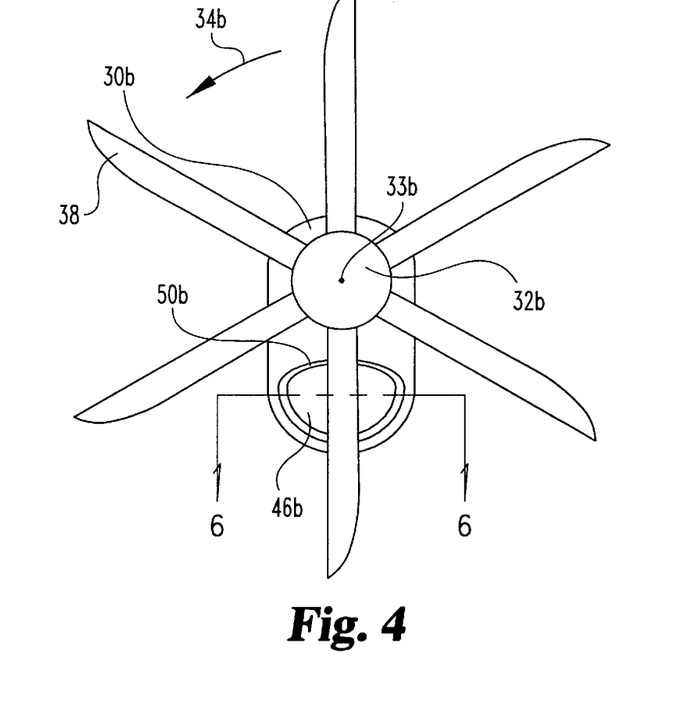
FIG. 4 is a front elevational view of the right propeller and nacelle of the aircraft of FIG. 1.

FIG. 4 is a front elevational view of the right propeller and nacelle of the aircraft of FIG. 1. Propeller 32b rotates clockwise about axis 33b as shown by arrow 34b. As propeller 32b rotates, each blade 38 passes in front of an inlet airflow path 46b which is defined by inlet duct 48b. Freestream air from in front of propeller 32b, as well as air propelled by blade 38, enters duct 48b, where a portion of it flows into a gas turbine engine powering propeller 32b. Air enters inlet airflow path 46b through the forwardmost part of duct 48b, which is highlight 50b. Inlet duct 48b is offset from axis 33b, and is not annular about axis 33b. Each propeller blade 38 passes in front of highlight 50b once per each revolution of propeller 32b. Thus, there are six interactions of propeller blades 38 with the air entering inlet duct 48b per revolution of propeller 32b. As one example, propeller 32b rotating at 950 revolutions per minute has a blade passage frequency of 95 hertz. As another example, a four bladed propeller rotating at 1106 revolutions per minute, such as the T56 engine on a U.S.N. E2-C, has a blade passage frequency of about 74 hertz.

Figure 5:
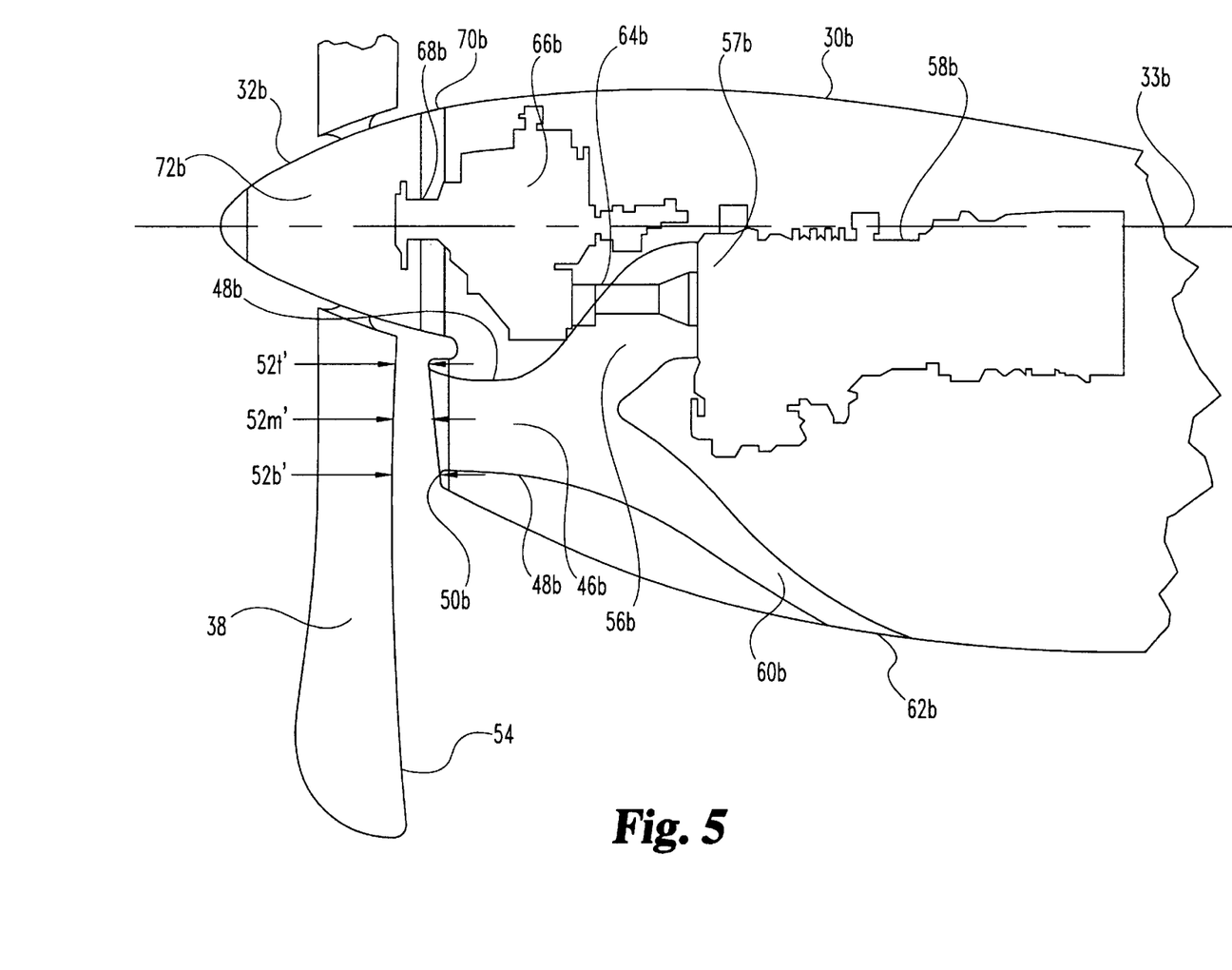
FIG. 5 is a diagramatic representation of the right hand nacelle of the aircraft of FIG. 1 taken along line 5—5.

FIG. 5 is a diagramatic representation of the right hand nacelle of the aircraft of FIG. 1 taken along line 5—5. Air enters inlet duct 48b through highlight 50b, which is the forwardmost part of duct 48b. Duct 48b has flowing within it a total airflow. A portion of this airflow splits and flows within engine duct 56b and is presented to compressor 57b of gas turbine engine 58b. Another portion of the total airflow splits and travels within the flowpath defined by scavenge duct 60b and exits nacelle 30b at scavenge exhaust 62b. Gas turbine engine 58b generates power that is transmitted through torque shaft 64b, into reduction gearbox 66b, through propeller shaft 68b, to power propeller 32b. A rotating spinner 72b and a fairing 70b are useful for providing a generally smooth flowpath for air near propeller 32b. The distance from trailing edge 54 to highlight 50b of inlet duct 48b is shown at various trailing edge locations along the portion of blade 38 that passes in front of highlight 50b. Spacings 52t', 52m', and 52b' indicate the minimum distances from trailing edge 54 to inlet duct 48b at the top, middle, and bottom, respectively, of highlight 50b. The minimum spacings 52 from trailing edge 54 to inlet duct 48b occur along the length of the portion of edge 54 passing in front of duct 48b, as measured to the closest portion of duct 48b.

Figure 6:
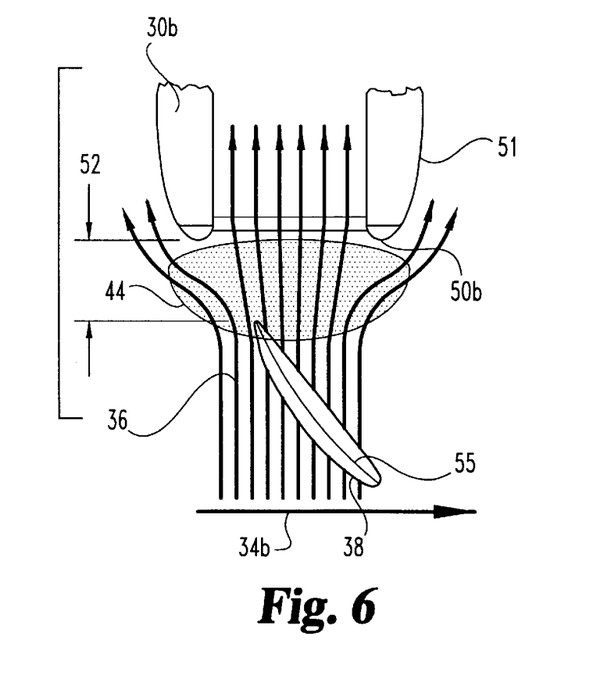
FIG. 6 is a diagramatic representation of the propeller blade and nacelle of FIG. 4 as taken along line 6—6.

FIG. 6 is a diagramatic representation of the propeller blade and nacelle of FIG. 4 as taken along line 6—6. Only the forward portion of nacelle 30b, including the forwardmost portions of inlet duct 48b, are shown. The amount of air flowing within air flow path 46b is determined by several factors, including by way of example only the cross-sectional area of inlet duct 48b, the amount of airflow required by the gas turbine engine 58, the existence and relative restriction of other flow ducts downstream of duct 48b, and the airspeed of aircraft 20, as represented by streamlines 36. It is common in the art to establish duct 48b to create an airflow pattern into the gas turbine engine that reduces the chance of a stall of compressor 57 during operation of the engine during takeoff. It is also common in the art to flow about 15% of the total airflow in inlet duct 48 through a duct other than an engine duct, such as duct 60.

As the forward airspeed of aircraft 20 increases, a higher mass flow of air is presented to highlight 50b. This ramming effect is believed to increase with airspeed. For example, a modern turboprop aircraft cruising at 300 KTAS would be expected to have about 50% to 125% more airflow presented to highlight 50b than an aircraft cruising at 200 KTAS. If inlet duct 48b, engine duct 56b, and scavenge duct 60b, as well as any other flowpaths that may be present, cannot effectively flow freestream air 36 presented to highlight 50b, then some of the freestream air diverts, or flows over the exterior sides 51 of nacelle 30b, and an area of partial stagnation develops in front of highlight 50b.

This area of partial stagnation is depicted as bubble 44. The shape and extent of bubble 44 is determined by factors such as the design of inlet duct 46b, flight conditions, and atmospheric conditions. This bubble is generally a volume in front of highlight 50b in which local static pressure is about 5% or more greater than atmospheric freestream pressure. Freestream air 36 presented to highlight 50 slows down as it approaches highlight 50 and diffuses sideways along sides 51 of nacelle 30. The forward extent of bubble 44, and the amount of stagnation and diffusion within bubble 44, increase with increasing airspeed of the aircraft.

As propeller blade 38 rotates about axis 33b, it is generally moving through freestream air. However, as a portion of blade 38 passes in front of highlight 50b, it passes through bubble 44. Airflow around that portion of blade 38 rapidly changes as blade 38 advances across highlight 50b and toward fuselage 22. The interaction of blade 38 with bubble 44 creates pressure fluctuations on area 42 of fuselage 22.

Pressure fluctuations created by the interaction of blade 38 with bubble 44 increase as blade angle 53 increases. Blade angle 53 increases as the engine produces more power, and for a given power increases as airspeed increases. Increasing blade angle 53 results in trailing edge 54 coming closer to highlight 50b. Thus, higher blade angle 53 results in blade 38 interacting with more of bubble 44, and also results in trailing edge 54 interacting with the more highly stagnated portions of bubble 44.

Figure 7:
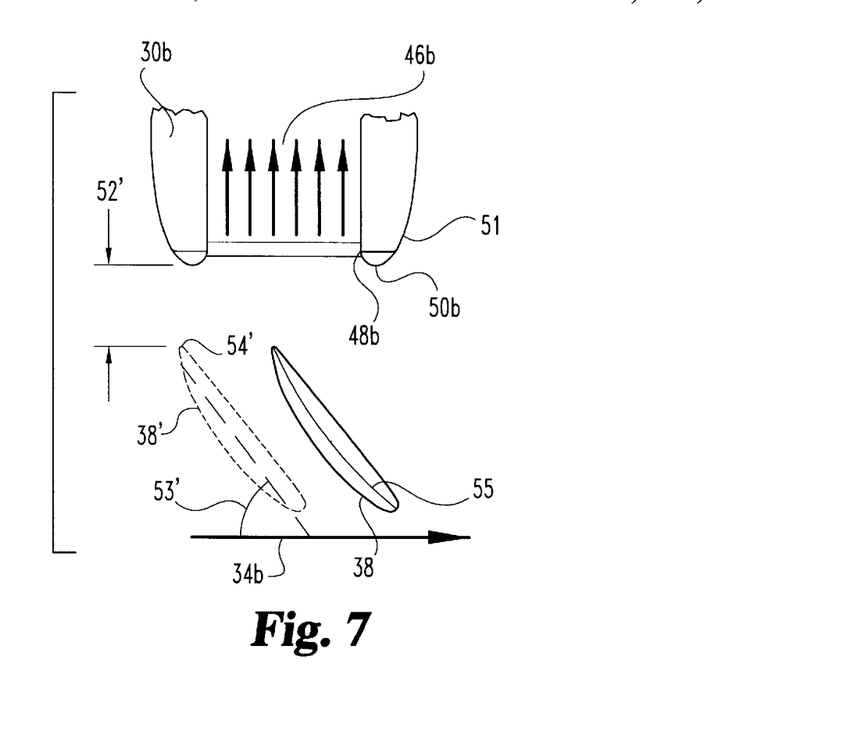
FIG. 7 is a diagrammatic representation of the propeller blade and nacelle of FIG. 6, with the propeller at a higher power setting.
Figure 8:
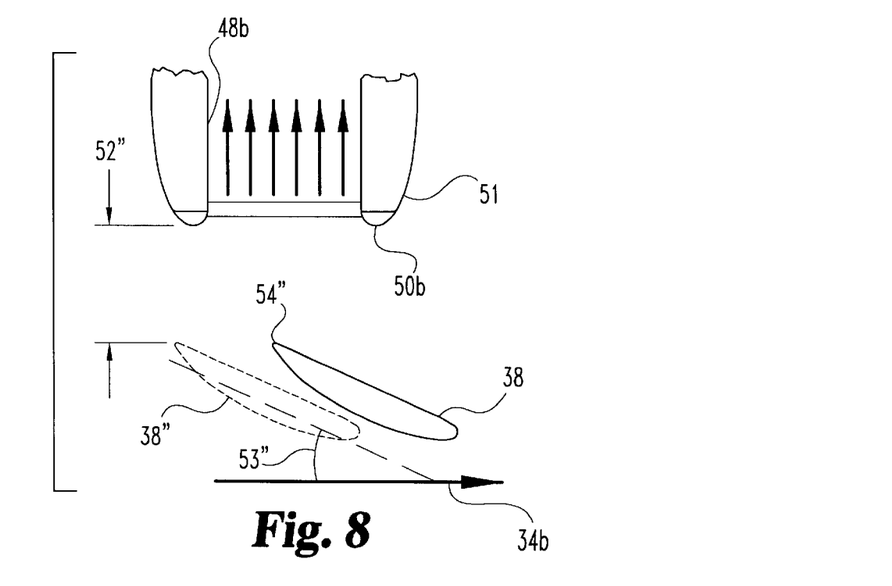
FIG. 8 is a diagrammatic representation of the propeller blade and nacelle of FIG. 6, with the propeller at a lower power setting.

FIG. 7 and FIG. 8 are diagrammatic representations of the propeller blade and nacelle of FIG. 6, including a dotted line representation of the propeller blade just prior to its position in front of inlet duct 48b. Length 55 is the length of the chord of the portion of blade 38 passing in front of duct 48b. Blade 38' of FIG. 7 is shown at a relatively high blade angle 53'. Blade 38" of FIG. 8 is shown at a relatively low blade angle 53". Blade 38' is shown under conditions of higher airspeed or higher power than blade 38". As airspeed decreases or power decreases, trailing edge 54" moves farther away from highlight 50b. Given that chord length 55 does not change, the ratio of space 52' to chord 55 is lower than the ratio of space 52" to chord length 55. Thus, there is less aerodynamic interaction of blade 38" with bubble 44 than there is for blade 38' with bubble 44.

It is believed that one source of noise may be related to an aerodynamic interaction between the retreating propeller blade and the inlet duct. It is also believed that as propeller blades 38 of propeller 32b rotate in front of left inlet 48b, there is an aerodynamic interaction of blade 38 with bubble 44 that creates an area of pressure fluctuations to the side of the plane of rotation of the propeller, in the direction of the blade as it passes past the inlet. For example, on aircraft 20 this interaction causes area 42 of fuselage 22 to be a source of noise into fuselage interior 39.

The aerodynamic interaction between propeller blade 38 and air inlet duct 48b creates increasing amounts of noise in the interior of a fuselage as the airspeed of the aircraft increases. High airspeed leads to a stagnation bubble in front of the air inlet. In order for the aircraft to maintain the high airspeed in a cruise condition, larger amounts of blade angle produce the required thrust. The present invention is especially useful during cruising conditions of airspeed greater than about 200 KTAS and altitude greater than about 20,000 feet. The present invention reduces the interaction of blade 38 with bubble 44, resulting in less noise within fuselage interior 39.

In a first embodiment of the present invention, propeller 32b is spaced apart from highlight 50b, such that during cruise of aircraft 20 the ratio of space 52 to chord length 55 is greater than about one fourth and less than about 1. This space to chord ratio is achieved by the relative spacing of highlight 50b to propeller 32b. On a newly designed aircraft, this space to chord ratio can be achieved by proper placement of highlight 50b to propeller 32b. Some propellers, engines, and aircraft have been aerodynamically analyzed and relationships developed among variables such as blade angle, airspeed, required thrust for cruise, and required engine power. Such analytical tools permit prediction of blade angle 53 for a cruising condition of aircraft 20. One of ordinary skill in the art can use such tools to establish the relative spacing of the propeller and inlet duct in accordance with the present invention. It may also be helpful to have forward curvature of trailing edge 54, as shown in FIG. 5, or to have top to bottom angling of the forwardmost part of highlight 50b, also as shown in FIG. 5.

On existing aircraft, it is possible to achieve the space to chord ratio by modifying inlet duct 48b to increase space 52. For example, the forward extent of highlight 50b can be reduced, or the attachment points of highlight 50b can be moved aft. It is also possible to achieve the space to chord ratio by installing a longer shaft 68 between gearbox 66 and propeller 32b. The space to chord ratio can also be increased by changing the manner in which propeller shaft 68 attaches to propeller 32b, for example by using a spacer that moves propeller 32b forward. For those aircraft on which propeller 32b is moved forward, it may also be desireable to install a fairing 70 to maintain smooth flow of air proximate to propeller 32b. It is also possible to use an extended spinner 72 to provide a smooth aerodynamic cover over the gap between propeller blade 32b and nacelle 30b.

In one example of the first embodiment, a propeller shaft 68 about 2.5 inches longer than the original shaft was used to provide positioning of the propeller relative to the highlight of the inlet duct. The aircraft included a six bladed propeller and active noise control. With a longer shaft 68 a space to chord ratio of approximately 0.34 to 0.40 was achieved. With the previous shorter propeller shaft, the space to chord ratio was about 0.15 to 0.21. The longer shaft resulted in about a 2 db (A) reduction in the average seated noise level within the aircraft fuselage when the aircraft was cruising at or above an altitude of 25,000 feet at a speed in excess of 300 KTAS.

A second embodiment of the present invention reduces the size and magnitude of bubble 44 by increasing airflow through scavenge duct 60b. It is common in the art to flow about 15% of the total airflow in inlet duct 48b through scavenge duct 60b. The remaining 85% of the total airflow flows through engine duct 56b into gas turbine engine 58, or through other ducts. The flow of 15% of total airflow through scavenge duct 60 provides protection to the engine from icing and foreign object damage (FOD), provides an increased static pressure to engine 58 by ram effects, and maintains a low level of aerodynamic drag within duct 60b.

In the second embodiment of the present invention, the flow area of scavenge exhaust 62b is increased, along with the flowpath area defined by scavenge duct 60b. Flow through engine duct 56b is greater than about 40% of total airflow in duct 48b, and less than about 60% of total airflow in duct 48b. As a result of the increased airflow capacity of scavenge duct 60b, total airflow within duct 48b increases by about 25% to 45%. The increased airflow results in less stagnation of freestream air in front of highlight 50b. The bubble becomes smaller in size and therefore interacts less with blade 38. Also, the magnitude of stagnation and diffusion within the bubble is lessened, so that trailing edge 54 is exposed to less aerodynamic change as it passes in front of highlight 50b. Although the second embodiment of the present invention is shown with a scavenge duct 60b and scavenge exhaust 62b with increased flow capacity, it is also possible to reduce the size and magnitude of the bubble by incorporating another duct and exhaust in fluid communication with inlet duct 48b.

Figure 9:
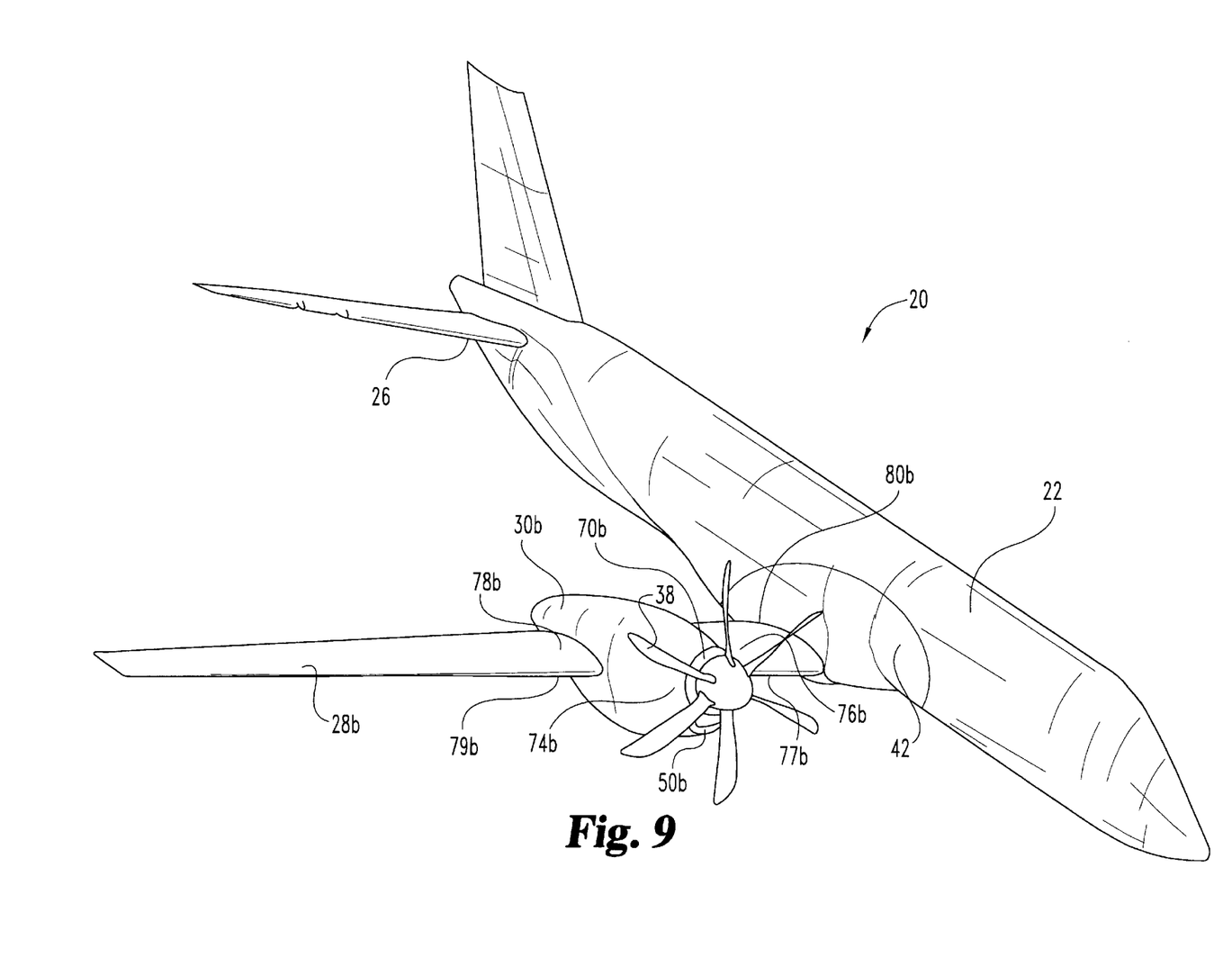
FIG. 9 is a front, top, right side perspective view of the righthand half of the aircraft of FIG. 1.

FIG. 9 is a front, top, right side perspective view of the righthand half of the aircraft of FIG. 1. When aircraft 20 is operated under cruise conditions, the present invention reduces fluctuating pressures on several areas of aircraft 20, including reductions on highlight 50b and forward portion 74b of nacelle 30b. There are also reductions in pressures on upper inboard wing surface 76b, lower inboard wing surface 77b, upper outboard wing surface 78b, and lower outboard wing surface 79b. Pressures are also reduced on area 42 of fuselage 22 generally around wing root 80b and aft of the plane of rotation of propeller 32b.

This source of noise from the interaction of blade 38 with inlet 48b has been noted on aircraft that include noise-reducing features such as six bladed propellers, active noise control 37 within fuselage interior 39, tuned mechanical dampers 43 within or on fuselage 22, and angular phasing of propeller 32a relative to propeller 32b. However, the present invention is useful on aircraft that do not include all or any of the above-mentioned noise-reducing features.

Those of ordinary skill in the art recognize the contribution of six bladed propellers, especially those with sweep, as generally creating less noise within fuselage interiors while permitting increased aircraft speed. For example, six bladed propellers are successful in reducing acoustic noise impinging upon the fuselage, levels which can be as high as 140 decibels (A) OASPL on aircraft with propellers having less than six blades.

Active noise control systems are employed within fuselage interiors to cancel noise generated by propellers. One example of such a noise cancellation system can be found in U.S. Pat. No. 5,526,292 issued to Hodgson et al. However, active noise control may require over fifty microphones and dozens of speakers in a fifty passenger aircraft. Furthermore, the active noise control system may be successful in reducing fuselage interior noise at BPF, but may have insufficient capability to significantly reduce 2×BPF or 3×BPF.

Those of ordinary skill in the art also recognize the usefulness of vibration absorbers or mechanical dampers within or on the fuselage to reduce interior noise. Such dampers are often useful in a narrow frequency band related to the blade passage frequency (BPF) of the propeller. However, an array of tuned vibration absorbers in a turboprop aircraft can weigh several hundred pounds, and does not reduce 2×BPF or 3×BPF if not tuned to those frequencies.

Various features such as six bladed propellers and angular phasing of propellers have been useful in one example to maintain the average seated noise level within the fuselage to less than 90 db, with the BPF contribution to the noise being about one db less than the average seated level. The 2×BPF and 3×BPF contributions, along with noise from other sources, was about four to six db less than the average seated level.

With the addition of tuned vibration absorbers in this same example, the average seated level was reduced to less than 85 db, with the BPF contribution to the noise being about five db less than the average seated level. The 2×BPF and 3×BPF contributions, along with noise from other sources, was about one to two db less than the average seated level. Thus in this example the 2×BPF and 3×BPF contributions became a larger portion of the overall average seated noise level than the BPF contribution Near field noise levels at BPF, 2×BPF, 3×BPF, and higher harmonics may exist generally in the field to the left of propeller 32b, including area 42 of fuselage 42. Some embodiments of the present invention provide a reduction in near field fluctuating pressures at all frequencies of about 3 db. One embodiment of the present invention provides a reduction in fuselage interior noise at 2×BPF and 3×BPF harmonics.

Certain embodiments of the present invention have beneficial effects on the propeller blades also. As propeller blade 38 rotates and generates thrust, there is a spanwise pressure loading on each propeller blade 38 that changes suddenly as blade 38 passes in front of highlight 50b. Certain embodiments of the present invention decrease this change in spanwise loading. Some embodiments of the present invention result in an increase in thrust of about 2.5% for the same blade angle 53 and rotational speed. Certain embodiments of the present invention may also have a beneficial effect on the torque required to rotate the propeller 32b. The torque required to rotate a single blade 38 increases as that blade passes in front of highlight 50b. With some embodiments of the present invention the peak to peak amplitude of this fluctuating torque is reduced by about 10% to 15%. This reduction in torque variation may reduce vibration levels transmitted into the aircraft structure by propeller 32b. Those of ordinary skill in the art will recognize that many of the aforementioned benefits are provided by certain embodiments of the present invention regardless of the direction of rotation of the propellers or the offset location of the inlet duct, and may apply to propellers located on either wing or on the fuselage.

For a space to chord ratio greater than the unity, near field noise and fluctuating pressures on fuselage 22 may increase. This increase may be noted on the underside of fuselage 22 forward of the wing root. The source of this noise for a space to chord ratio greater than about unity is left propeller 32a. Also, as the space to chord ratio increases, engine and propeller mount loads increase.

The present invention is useful on a wide variety of turboprop aircraft, including various versions of the E2 and C2 aircraft, various versions of the P3 Orion aircraft, various versions of the C-130 Hercules aircraft, and other aircraft powered by turboprop engines such as the Allison T56, Model 501, and AE 2100 families of engines. The invention is also useful on larger turboprop aircraft, and smaller tuboprop aircraft, such as those powered by the Allison Model 250 and T800 engines.

Although the present invention has been described as incorporated on a two engine aircraft, the present invention is also useful on single engine aircraft and three or four engine aircraft.

Also, although the present invention has been described as incorporated on a fixed wing aircraft, the present invention is also useful on a tilt-rotor aircraft when operated in a turboprop mode.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    an aircraft with a wing, said aircraft cruising at an altitude greater than about 20,000 feet above sea level and an airspeed greater than about 250 knots true airspeed;

a propeller with a plurality of propeller blades, said propeller being located adjacent said wing, said propeller rotating to provide forward thrust for said aircraft, each said propeller blades having a trailing edge;

a gas turbine engine for powering said propeller; and an offset inlet duct for providing air to said gas turbine engine, said inlet duct located such that a portion of each of said propeller blades passes in front of said inlet duct when said propeller is rotating;

wherein said portion has a chord length and a trailing edge and a minimum distance from said trailing edge to said inlet duct, such that the ratio of the minimum distance to the chord length is greater than about 0.25 and less than about 1.

2. The apparatus of claim 1 wherein said inlet duct has flowing through it a total airflow, and further comprising:

an engine duct in fluid communication with said inlet duct and with said gas turbine engine, said engine duct flowing more than about fourty percent of the total airflow and less than about sixty percent of the total airflow; and a third duct in fluid communication with said inlet duct, said third duct flowing a portion of the total airflow.

3. The apparatus of claim 1 wherein said propeller is rotating at a speed greater than about 900 revolutions per minute.

4. The apparatus of claim 1 wherein said aircraft includes a fuselage, said fuselage defines an interior, and further comprising an active noise control system located within the interior for reducing noise.

5. The apparatus of claim 1 wherein said aircraft includes a fuselage, said fuselage defines an interior, and the average seated interior noise level is less than about 90 decibels (A) overall sound pressure level.

6. The apparatus of claim 1 wherein said aircraft includes a fuselage, said fuselage defines an interior, and the average seated interior noise level is less than about 85 decibels (A) overall sound pressure level.

7. The apparatus of claim 1 wherein said aircraft includes a fuselage, said fuselage defines an interior, and the average seated interior noise level is less than about 81 decibels (A) overall sound pressure level.

8. The apparatus of claim 1 wherein said propeller has at least four propeller blades.

9. The apparatus of claim 1 wherein said propeller has at least six propeller blades.

10. The apparatus of claim 9 wherein said propeller is rotating at a speed greater than about 900 revolutions per minute.

11. The apparatus of claim 10 wherein said aircraft includes a fuselage, said fuselage defines an interior, and further comprising an active noise control system located within the interior for reducing noise.

12. The apparatus of claim 11 wherein the average seated interior noise level is less than about 85 decibels (A) overall sound pressure level.

13. The apparatus of claim 11 wherein the average seated interior noise level is less than about 81 decibels (A) overall sound pressure level.

14. The apparatus of claim 10 wherein the average seated interior noise level is less than about 85 decibels (A) overall sound pressure level.

15. The apparatus of claim 10 wherein the average seated interior noise level is less than about 81 decibels (A) overall sound pressure level.

16. The apparatus of claim 1 wherein said aircraft is cruising at an altitude greater than about 25,000 feet above sea level and an airspeed greater than about 300 knots true airspeed.

17. The apparatus of claim 16 wherein said inlet duct has flowing through it a total airflow, and further comprising:

an engine duct in fluid communication with said inlet duct and with said gas turbine engine, said engine duct flowing more than about fourty percent of the total airflow and less than about sixty percent of the total airflow; and a third duct in fluid communication with said inlet duct, said third duct flowing a portion of the total airflow.

18. The apparatus of claim 16 wherein said propeller is rotating at a speed greater than about 900 revolutions per minute.

19. The apparatus of claim 16 wherein said aircraft includes a fuselage, said fuselage defines an interior, and further comprising an active noise control system located within the interior for reducing noise.

20. The apparatus of claim 16 wherein said aircraft includes a fuselage, said fuselage defines an interior, and the average seated interior noise level is less than about 90 decibels (A) overall sound pressure level.

21. The apparatus of claim 16 wherein said aircraft includes a fuselage, said fuselage defines an interior, and the average seated interior noise level is less than about 85 decibels (A) overall sound pressure level.

22. The apparatus of claim 16 wherein said aircraft includes a fuselage, said fuselage defines an interior, and the average seated interior noise level is less than about 81 decibels (A) overall sound pressure level.

23. The apparatus of claim 16 wherein said propeller has at least four propeller blades.

24. The apparatus of claim 16 wherein said propeller has at least six propeller blades.

25. The apparatus of claim 24 wherein said propeller is rotating at a speed greater than about 900 revolutions per minute.

26. The apparatus of claim 25 wherein said aircraft includes a fuselage, said fuselage defines an interior, and further comprising an active noise control system located within the interior for reducing noise.

27. The apparatus of claim 26 wherein the average seated interior noise level is less than about 85 decibels (A) overall sound pressure level.

28. The apparatus of claim 26 wherein the average seated interior noise level is less than about 81 decibels (A) overall sound pressure level.

29. The apparatus of claim 25 wherein the average seated interior noise level is less than about 85 decibels (A) overall sound pressure level.

30. The apparatus of claim 25 wherein the average seated interior noise level is less than about 81 decibels (A) overall sound pressure level.

31. An apparatus comprising:

an aircraft, said aircraft cruising at an altitude greater than about 20,000 feet above sea level and an airspeed greater than about 200 knots true airspeed;

a propeller for providing thrust to said aircraft;

a gas turbine engine for providing power to said propeller, wherein said engine is a model T56, model 501 or model AE 2100; and a means for increasing the distance between said gas turbine engine and said propeller;

wherein the propeller has at least four propeller blades, the engine has an offset inlet duct, a portion of each propeller blade passes in front of the inlet duct, and the portion has a chord length and a trailing edge, said increasing means spacing apart the trailing edge from the inlet duct such that the minimum distance from the trailing edge to the inlet duct is greater than about one fourth of the chord length and less than about the chord length.

32. The apparatus of claim 31 wherein said aircraft is cruising at an airspeed greater than about 250 knots true airspeed.

33. The apparatus of claim 31 wherein said aircraft is cruising at an airspeed greater than about 300 knots true airspeed.

34. An apparatus comprising:
an aircraft, said aircraft cruising at an altitude greater than about 20,000 feet above sea level and an airspeed greater than about 200 knots true airspeed;
a propeller for providing thrust to said aircraft; said propeller having a plurality of propeller blades;
a gas turbine engine for providing power to said propeller, said engine having a compressor, wherein said engine is a model T56 or a model 501;
an offset inlet duct for providing air to the compressor of said engine; and
a means for increasing the distance between said inlet duct and said propeller blades;
wherein a portion of each said propeller blade passes in front of said inlet duct, and the portion has a chord length and a trailing edge, said increasing means spacing apart the trailing edge from said inlet duct such that the minimum distance from the trailing edge to said inlet duct is greater than about one fourth of the chord length and less than about the chord length.

35. The apparatus of claim 34 wherein said aircraft is cruising at an airspeed greater than about 250 knots true airspeed.

36. The apparatus of claim 34 wherein said aircraft is cruising at an airspeed greater than about 300 knots true airspeed.

37. A method for spacing a propeller relative to an inlet for a gas turbine engine, comprising:
determining a cruise speed for an aircraft powered by a rotating propeller, a gas turbine engine driving the propeller, the propeller having a plurality of propeller blades;
placing the propeller such that a portion of each propeller blade passes in front of an offset inlet duct providing air to the engine; and
establishing the relative spacing of the offset inlet duct and the propeller, such that the spacing from the offset inlet duct to the trailing edge of the portion of the propeller blades is greater than about one fourth of the chord length of the portion, and less than about the chord length of the portion.

38. A method for placing a propeller relative to an inlet for a gas turbine engine, comprising:
flying an aircraft at a cruising speed, the aircraft being powered by a propeller, the propeller being driven by a gas turbine engine, the propeller having a plurality of propeller blades;
providing air to the compressor of the gas turbine engine through an offset inlet duct;
rotating the propeller such that a portion of a propeller blade passes in front of of the offset duct; and
positioning the offset inlet duct relative to the propeller such that the minimum distance from the offset inlet duct to the trailing edge of the portion of the propeller blades is greater than about one fourth of the chord length of the portion, and less than about the chord length of the portion.

39. A method for reducing the noise within the interior of the fuselage of a turboprop aircraft, comprising:
reducing noise with tuned vibration absorbers; and
placing the propeller relative to an inlet duct providing air to the engine such that the trailing edge of the portion of propeller blades passing in front of the inlet duct are more than a distance of one fourth of a blade chord length and less than a distance of a full chord length from the inlet duct when the aircraft is cruising at an airspeed greater than about 250 knots true airspeed and at an altitude greater than about 20,000 feet above sea level.

40. The method of claim 39 wherein the tuned vibration absorbers are tuned to about the frequency of the propeller blades passing in front of the inlet duct.

41. The method of claim 40 further comprising cancelling noise with an active noise control system.

42. The method of claim 41 further comprising providing a propeller with at least six propeller blades.

43. The method of claim 39 wherein the aircraft is cruising at an airspeed greater than about 300 knots true airspeed and at an altitude greater than about 25,000 feet above sea level.

44. The method of claim 43 wherein the tuned vibration absorbers are tuned to about the frequency of the propeller blades passing in front of the inlet duct.

45. The method of claim 44 further comprising cancelling noise with an active noise control system.

46. The method of claim 45 further comprising providing a propeller with at least six propeller blades.

47. A method for reducing the noise within the interior of the fuselage of a turboprop aircraft, comprising:
cancelling noise with an active noise control system; and
placing the propeller relative to an inlet duct providing air to the engine such that the trailing edge of the portion of propeller blades passing in front of the inlet duct are a distance of more than one fourth of a blade chord length and less than a distance of a full chord length from the inlet duct when the aircraft is cruising at an airspeed greater than about 250 knots true airspeed and at an altitude greater than about 20,000 feet above sea level.

48. The method of claim 47 further comprising reducing noise with tuned vibration absorbers.

49. The method for claim 47 wherein the aircraft is cruising at an airspeed greater than about 300 knots true airspeed and at an altitude greater than about 25,000 feet above sea level.

50. The method of claim 49 further comprising reducing noise with tuned vibration absorbers.

51. A method for reducing the noise within the interior of the fuselage of a turboprop aircraft, comprising:
providing a propeller with at least six propeller blades; and
placing the propeller relative to an inlet duct providing air to the engine such that the trailing edge of the portion of propeller blades passing in front of the inlet duct are a distance of more than one fourth of a blade chord length and less than a distance of a full chord length from the inlet duct when the aircraft is cruising at an airspeed greater than about 250 knots true airspeed and at an altitude greater than about 20,000 feet above sea level.

52. The method of claim 51 further comprising reducing noise with tuned vibration absorbers.

53. The method of claim 52 wherein the tuned vibration absorbers are tuned to about the frequency of the propeller blades passing in front of the inlet duct.

54. The method of claim 51 wherein the aircraft is cruising at an airspeed greater than about 300 knots true airspeed and at an altitude greater than about 25,000 feet above sea level.

55. The method of claim 54 further comprising reducing noise with tuned vibration absorbers.

56. The method of claim 55 wherein the tuned vibration absorbers are tuned to about the frequency of the propeller blades passing in front of the inlet duct.

57. An apparatus comprising:
- an aircraft propelled by a propeller, said aircraft cruising at an altitude greater than about 20,000 feet above sea level and an airspeed greater than about 250 knots true airspeed;
- a gas turbine engine for providing power to said propeller;
- an inlet duct having flowing through it a total airflow;
- an engine duct in fluid communication with said inlet duct and with said gas turbine engine, said engine duct flowing more than about forty percent of the total airflow and less than about sixty percent of the total airflow; and
- a scavenge duct in fluid communication with said inlet duct, said scavenge duct flowing a portion of the total airflow.

58. The apparatus of claim 57 wherein said propeller rotates and has a plurality of propeller blades, a portion of each said propeller blade passing in front of said inlet duct.

59. The apparatus of claim 58 wherein said propeller is rotating at a speed greater than about 900 revolutions per minute.

60. The apparatus of claim 58 wherein said propeller has at least four propeller blades.

61. The apparatus of claim 58 wherein said propeller has at least six propeller blades.

62. The apparatus of claim 57 wherein said aircraft includes a fuselage, said fuselage defines an interior, and further comprising an active noise control system located within the interior for reducing noise.

63. The apparatus of claim 61 wherein said aircraft includes a fuselage, said fuselage defines an interior, and the average seated interior noise level is less than about 90 decibels (A) overall sound pressure level.

64. The apparatus of claim 61 wherein said aircraft includes a fuselage, said fuselage defines an interior, and the average seated interior noise level is less than about 85 decibels (A) overall sound pressure level.

65. The apparatus of claim 61 wherein said aircraft includes a fuselage, said fuselage defines an interior, and the average seated interior noise level is less than about 81 decibels (A) overall sound pressure level.

66. The apparatus of claim 57 wherein said aircraft is cruising at an altitude greater than about 25,000 feet above sea level and an airspeed greater than about 300 knots true airspeed.

67. The apparatus of claim 66 wherein said propeller rotates and has a plurality of propeller blades, a portion of each said propeller blade passing in front of said inlet duct.

68. The apparatus of claim 67 wherein said propeller is rotating at a speed greater than about 900 revolutions per minute.

69. The apparatus of claim 67 wherein said propeller has at least four propeller blades.

70. The apparatus of claim 67 wherein said propeller has at least six propeller blades.

71. The apparatus of claim 66 wherein said aircraft includes a fuselage, said fuselage defines an interior, and further comprising an active noise control system located within the interior for reducing noise.

72. The apparatus of claim 70 wherein said aircraft includes a fuselage, said fuselage defines an interior, and the average seated interior noise level is less than about 90 decibels (A) overall sound pressure level.

73. The apparatus of claim 70 wherein said aircraft includes a fuselage, said fuselage defines an interior, and the average seated interior noise level is less than about 85 decibels (A) overall sound pressure level.

74. The apparatus of claim 70 wherein said aircraft includes a fuselage, said fuselage defines an interior, and the average seated interior noise level is less than about 81 decibels (A) overall sound pressure level.

75. A method for flowing air in an inlet duct of an aircraft, comprising:
- passing a plurality of propeller blades in front of an offset inlet duct;
- flowing a total airflow into the inlet duct;
- splitting the offset inlet duct into an engine duct for providing air to a gas turbine engine and at least one other duct; and
- flowing more than about forty percent of the total airflow and less than about sixty percent of the total airflow through the engine duct.

* * * * *

UNITED STATES PATENT AND TRADEMARK OFFICE
CERTIFICATE OF CORRECTION

PATENT NO : 5,961,067

DATED : October 5, 1999

INVENTOR(S) : Edward J. Hall, et al.

It is certified that error appears in the above-identified patent and that said Letters Patent is hereby corrected as shown below:

In Col. 1, line 4, replace "This is a Provisional application No. 60/025,646. filed Sep. 10, 1996." with -- The present application claims the benefit of U.S. Provisional Application No. 60/025,646, filed Sept. 10, 1996 --.

In Block 73 of the title page, please change "indianapolis" to -- Indianapolis -- .

In Col. 1, line 66, replace ", diagramatic" with -- diagrammatic --.

In Col. 2, lines 3 and 5, replace "diagramatic" with -- diagrammatic --.

In Col. 3, line 8, replace "diagramatic" with -- diagrammatic --.

In Col. 4, line 38, replace "diagramatic" with -- diagrammatic --.

In Col. 7, line 67, please insert a period after "contribution".

In Col. 8, line 3, replace "42" with -- 22 --.

In Col. 9, line 21, replace "fourty" with -- forty --.

In Col. 10, line 9, replace "fourty" with -- forty --.

In Col. 11, lines 3 and 29, replace "increasing means" with -- means for increasing --.

UNITED STATES PATENT AND TRADEMARK OFFICE
CERTIFICATE OF CORRECTION

PATENT NO. : 5,961,067
DATED : October 5, 1999
INVENTOR(S) : Edward J. Hall, et al.

It is certified that error appears in the above-identified patent and that said Letters Patent is hereby corrected as shown below:

In Col. 13, line 25, replace "fourty" with -- forty --.

In Col. 14, line 46, replace "fourty" with -- forty --.

Signed and Sealed this

Sixth Day of March, 2001

Attest:

NICHOLAS P. GODICI

*Attesting Officer*   Acting Director of the United States Patent and Trademark Office